C. A. DEVERO.
TIRE SETTER.
APPLICATION FILED JAN. 12, 1911.
1,016,217.
Patented Jan. 30, 1912.
2 SHEETS—SHEET 1.
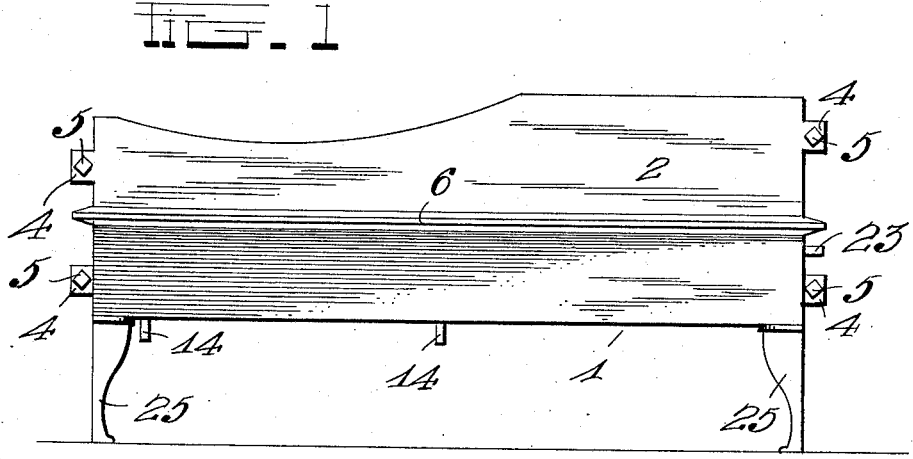
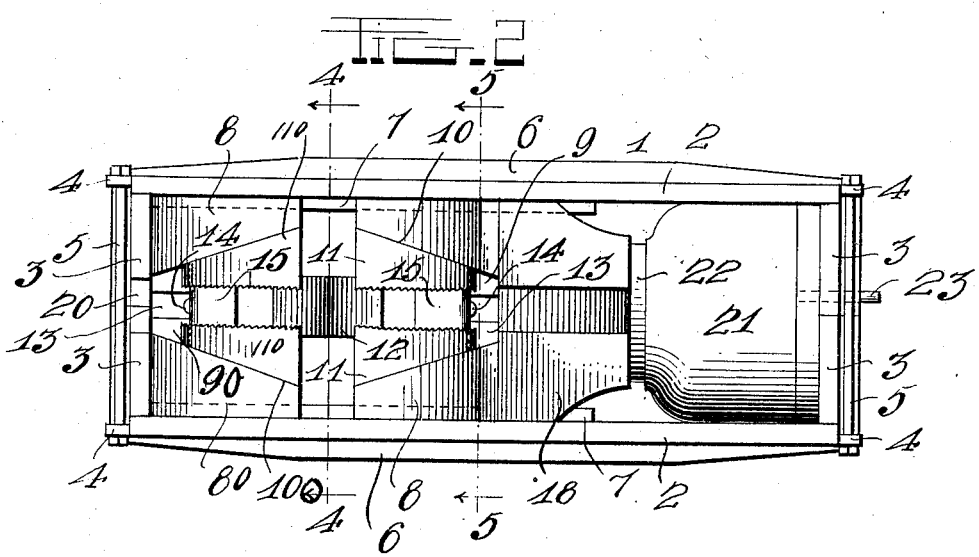
Witnesses
C. R. Hardy
O. B. Hopkins
Inventor
C. A. Devero
by H. B. Willson & Co.
Attorneys C. A. DEVERO.
TIRE SETTER.
APPLICATION FILED JAN. 12, 1911.
1,016,217.
Patented Jan. 30, 1912.
2 SHEETS—SHEET 2.
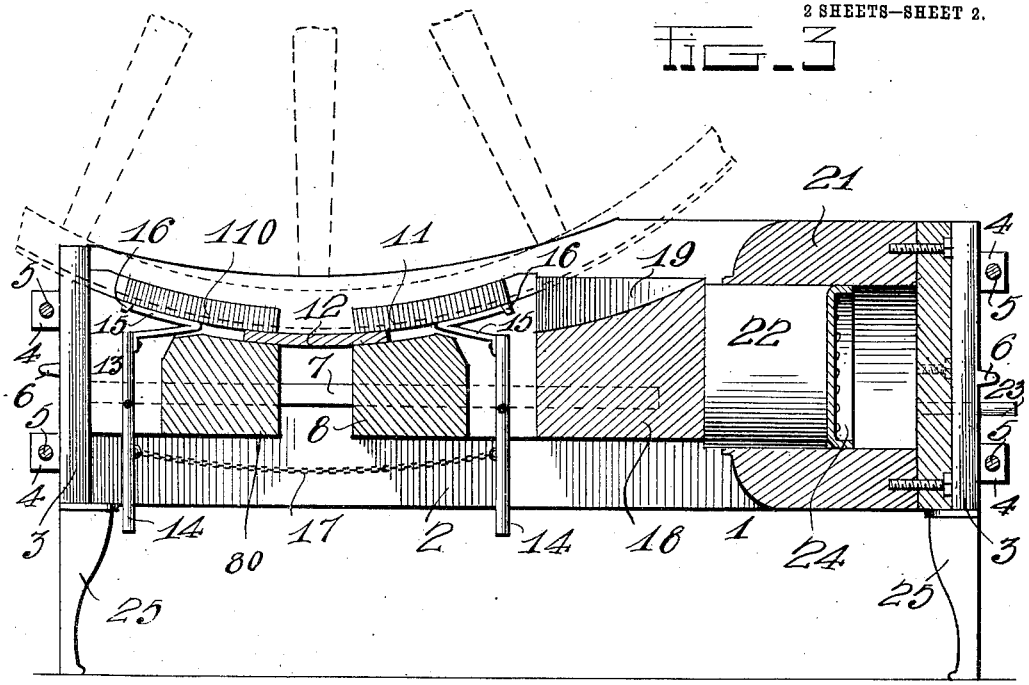
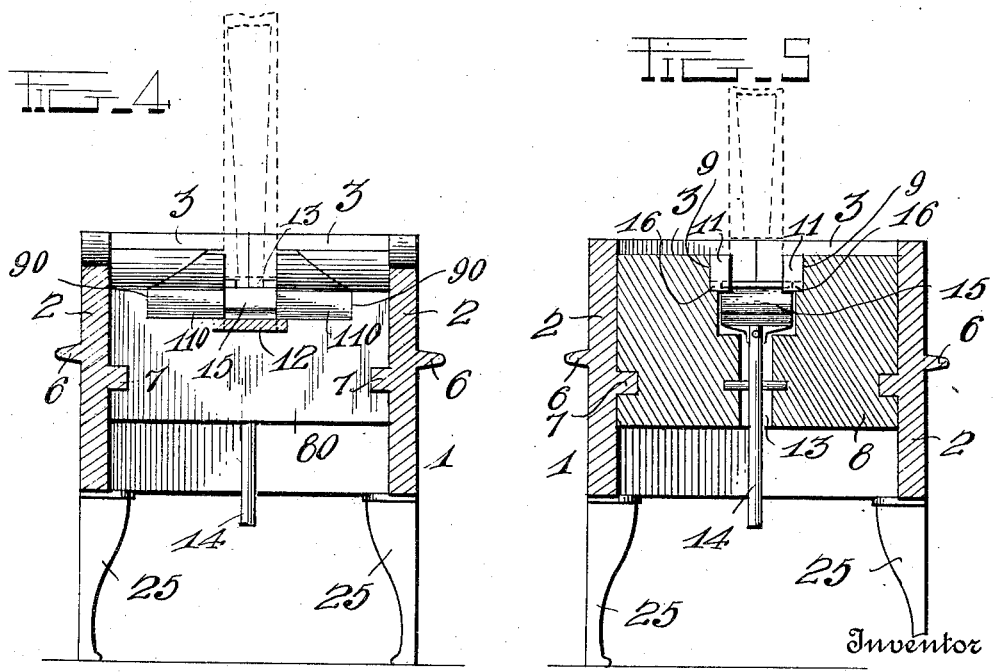
Witnesses
W. P. Hardy
O. B. Hopkins
Inventor
C. A. Devero
by H. B. Willson & Co.
Attorneys
COLUMBIA PLANOGRAPH CO., WASHINGTON, D. C.

UNITED STATES PATENT OFFICE.

CHARLES A. DEVERO, OF SPRINGFIELD, ILLINOIS, ASSIGNOR TO THE KEOKUK HYDRAULIC TIRE SETTER COMPANY.

TIRE-SETTER.

1,016,217. Specification of Letters Patent. Patented Jan. 30, 1912.

Application filed January 12, 1911. Serial No. 602,330.

*To all whom it may concern:*

Be it known that I, CHARLES A. DEVERO, a citizen of the United States, residing at Springfield, in the county of Sangamon and State of Illinois, have invented certain new and useful Improvements in Tire-Setters; and I do declare the following to be a full, clear, and exact description of the invention, such as will enable others skilled in the art to which it appertains to make and use the same.

This invention relates to improvements in means for shrinking or setting cold tires.

One object of the invention is to provide a machine of this character having an improved construction and arrangement of tire gripping mechanism.

Another object is to provide an improved means for operating the tire gripping and shrinking mechanism.

A further object is to provide a tire shrinking or setting machine which will be simple, strong and durable in construction, efficient and reliable in operation and well adapted to the purpose for which it is designed.

With these and other objects in view, the invention consists of certain novel features of construction, combination and arrangement of parts as will be more fully described and particularly pointed out in the appended claims.

In the accompanying drawings: Figure 1 is a side view of my improved tire setter; Fig. 2 is a top plan view of the same; Fig. 3 is a central vertical longitudinal section; Fig. 4 is a vertical cross section on the line 4—4 of Fig. 2; Fig. 5 is a similar view on the line 5—5 of Fig. 2.

Referring more particularly to the drawings, 1 denotes the supporting frame or casing comprising longitudinal side plates 2 and right angular end plates 3. On the ends of the plates 2 near the opposite sides thereof, are upper and lower apertured lugs 4 in which are engaged tie bolts 5 whereby the side and end plates of the frame are securely clamped together. Around the outer surfaces of the sides and ends of the frame are formed centrally disposed longitudinal ribs 6 whereby the plates are braced and strengthened. On the inner sides of the side plates 2 of the frame are formed longitudinally disposed guiding and supporting ribs 7 the purpose of which will be hereinafter described.

Arranged in the frame 1 and slidably supported on the ribs 7 are oppositely disposed head blocks 8 and 80 having in their upper sides recesses 9 and 90, the vertical inner walls 10 and 100 of which are formed on an angle or inclined laterally from the outer toward the inner ends of the head blocks as shown. Loosely mounted in the recesses 9 and 90 of the head blocks 8 and 80 are tire gripping blocks 11 and 110 having tapered or laterally inclined outer sides which engage the inclined or angular walls 10 and 100 of the head blocks 8 and 80. The lower walls of the recesses 9 and 90 and the gripping blocks 11 and 110 are formed on a curve or arc of a circle to conform substantially to the curvature of a wheel or tire. Between the head blocks 8 and 80 and having its opposite ends engaged in the recesses 9 and 90 therein, is a curved wheel supporting plate 12 on which the wheel rests when in the machine.

In the outer ends of the head blocks 8 and 80 are vertical centrally disposed slots 13 in which are pivotally mounted vertically disposed adjusting levers 14 the upper ends of which are connected with the lower leaves of V-shaped grip-block supporting springs 15 arranged in the outer portion of the recesses 9 and 90 below the outer ends of the gripping blocks 11 and 110 said blocks having on their outer ends downwardly projecting lugs 16 with which the upper ends of the springs are operatively engaged. When a wheel is arranged in the machine between the gripping blocks 11 and 110 and engages the supporting plate 12, the tire of the wheel will engage the portion of the spring 15 between the blocks 11 and between the blocks 110 thereby compressing said springs until they conform with the circumference of the tire or wheel. In thus compressing the springs 15 the outer ends of the gripping blocks 11 and 110 supported thereby will drop so that said blocks will also conform to the curvature of the tire. When the plates have thus assumed a position corresponding with the circumference of the tire the lower ends of the levers 14 are moved inwardly, the proper direction to move the gripping blocks 11 and 110 outwardly between the inclined walls 10 and 100 of the recesses 9 and 90 in the head blocks 8 and 80 thus bringing the inner edges of the gripping blocks 11 and 110 into engagement with the opposite edges of the tire. The inner edges of the gripping blocks 11 and 110 are toothed or serrated to afford a firm grip on the edges of the tire as shown. The levers 14 are preferably connected together by a chain 17 whereby they are held in position. By providing the adjusting means for the tire gripping blocks, the latter may be brought into operative engagement with the tires of different widths and when so engaged are firmly gripped against the tire and the latter set or shrunk by a suitable operating mechanism hereinafter described.

The head block 80 at the forward end of the frame rests against the end plate 3 thereof while the outer end of the opposite head block 8 has engaged therewith a compression or follower block 18 in which is formed a centrally disposed groove 19 to receive the portion of the wheel projecting beyond the adjacent end of the head block 8. The end plates 3 at the opposite end of the frame are notched as at 20 to provide space for the portion of the wheel projecting beyond the outer end of the blocks 8 and 80. The follower block 18 has in its opposite sides longitudinal channels whereby said block is slidably engaged with the ribs 7. Arranged in the rear end of the frame is a fluid pressure cylinder 21 in the inner end of which is slidably mounted a piston 22 the outer end of which engages the adjacent end of the compression or follower block 18 whereby when the piston is forced out of the cylinder the block 18 will be actuated and the pressure of the piston applied therethrough to the head block 8 whereby the gripping blocks 11 of this head block are forced into firm engagement with the adjacent edges of the tire and the pressure of the piston is thus applied to the tire to shrink the latter. When the gripping blocks 11 of the head block 8 with which the follower block is engaged act on the tire, the latter will move with this head block 8 and this movement of the tire will be imparted to the gripping blocks 110 of the head block 80 in the forward end of the frame thereby forcing said gripping blocks 110 between the angular walls 100 of the recess 90 in this block 80 and causing these blocks 110 to firmly grip and hold the tire against the pressure exerted thereon by the piston through the opposing head block 8 and gripping blocks 11 thereby shrinking or setting the tire.

Arranged in the outer end of the cylinder 21 is a nipple 23 with which is adapted to be connected a fluid conducting pipe whereby the water or other fluid is conducted to the cylinder under pressure from any suitable form of pump or compressing mechanism. The inner end of the plunger 22 is provided with a suitable fluid operated packing or washer 24 whereby a fluid tight connection is formed between the piston and the walls of the cylinder.

If desired the frame 1 may be provided with feet or other suitable supporting devices 25 whereby the same is held at a suitable elevation.

By means of a machine constructed as herein shown and described the gripping members of the same will automatically adjust themselves to tires of different circumferences and may be readily adjusted to engage tires of different widths whereby a firm hold or grip may be obtained on the tire and the latter thus shrunk by the operating mechanism hereinbefore described. It will also be noted that by arranging the gripping devices as herein shown that the greater the pressure applied thereto the more tightly the said devices will grip and hold the tire.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim is:

1. In a tire upsetting machine comprising a pair of head blocks, provided with central longitudinal recesses, the combination therewith of a lever pivoted in the recess of each block, a spring mounted on the upper end of each lever, a gripping block in each recess slidable with relation to its head block and supported on one of the springs, and means on each spring engaging its block whereby each gripping block is made to slide on its head block when its spring lever is oscillated.

2. In a tire upsetting machine comprising a pair of head blocks, provided with central longitudinal recesses, the combination therewith of a lever pivoted in the recess of each block, a V-shaped spring secured to the upper end of each lever, a gripping block slidable in the recess of each head block and resting on its respective spring, and a downwardly projecting lug on the outer end of each gripping block engaging the outer end of its respective spring.

In testimony whereof I have hereunto set my hand in presence of two subscribing witnesses.

CHARLES A. DEVERO.

Witnesses:
L. A. KRAVICK,
ROY J. KUTSCHER.